United States Patent [19]
Mauch et al.

[11] 3,747,577
[45] July 24, 1973

[54] TEMPERATURE-DEPENDENT RESISTANCE ARRANGEMENT FOR CONTROLLING FUEL INJECTION AS A FUNCTION OF AIR INTAKE

[75] Inventors: Harald Mauch; Dieter Handtmann; Gerhard Haug, all of Korntal; Wolfgang Reichardt, Stuttgart; Hans Zeller, Doffingen; Ernst Zehender, Ottenbronn; Heinrich Knapp, Silberberg, all of Germany

[73] Assignee: Robert Bosch GmbH, Stuttgart, Germany

[22] Filed: Aug. 30, 1971

[21] Appl. No.: 176,124

[30] Foreign Application Priority Data
Aug. 29, 1970 Germany................... P 20 42 983.8

[52] U.S. Cl.. 123/32 EA, 123/119 R, 123/139 AW, 73/202
[51] Int. Cl............................................ F02m 51/00
[58] Field of Search.................. 123/32 AE, 32 EA, 123/119 R; 137/66, 457; 73/202, 204

[56] References Cited
UNITED STATES PATENTS

| | | | |
|---|---|---|---|
| 3,326,040 | 6/1967 | Walsh .................................. | 73/204 |
| 3,425,277 | 2/1969 | Adams................................. | 73/202 |
| 3,575,147 | 4/1971 | Harrison et al. ................. | 123/119 R |
| 3,051,752 | 8/1962 | Paule et al...................... | 123/32 EA |
| 3,460,520 | 8/1969 | Huber............................. | 123/32 EA |
| 2,941,524 | 6/1960 | Aldinger et al................. | 123/32 EA |

Primary Examiner—Laurence M. Goodridge
Attorney—Michael S. Striker

[57] ABSTRACT

A temperature-dependent resistor is placed in path of air intake. Resistor forms part of a bridge circuit. Amplifier input connected to the diagonal of bridge circuit, amplifier output connected in parallel with the two branches of bridge. Resulting feedback circuit maintains temperature-dependent resistor at a constant temperature by changing current therethrough to compensate for different cooling effects of air stream. Output voltage of amplifier constitutes measure of regulator current through temperature-dependent resistor and therefore measure of air intake. Circuits using amplifier output voltage to control fuel injection also illustrated.

15 Claims, 9 Drawing Figures

Patented July 24, 1973 3,747,577

INVENTORS
H. MAUCH, P. HANDTMANN
G. HAUG, W. REICHARDT
H. ZELLER, E. ZEHENDER
H. KNAPP

BY Michael S. Striker their ATTORNEY

INVENTORS
H. MAUCH
P. HANDTMANN
G. HAUG
W. REICHARDT
H. ZELLER
E. ZEHENDER
H. KNAPP

BY Michael S Striker their ATTORNEY

Patented July 24, 1973

INVENTORS
H. MAUCH
P. HANDTMANN
G. HAUG
W. REICHARDT
H. ZELLER
E. ZEHENDER
H. KNAPP

BY Michael S. Striker their ATTORNEY

INVENTORS
H. MAUCH
P. HANDTMANN
G. HAUG
W. REICHARDT
H. ZELLER
E. ZEHENDER
H. KNAPP

BY Michael S. Striker their ATTORNEY

TEMPERATURE-DEPENDENT RESISTANCE ARRANGEMENT FOR CONTROLLING FUEL INJECTION AS A FUNCTION OF AIR INTAKE

BACKGROUND OF THE INVENTION

This invention relates to fuel injection arrangements in internal combustion engines. In particular, it relates to such fuel injection arrangements wherein an electrical control circuit matches the quantity of fuel injected to the quantity of air taken in. The quantity of air taken in in these arrangements is measured by means of a temperature-dependent resistance which is arranged in the path of the intake air. German Auslegeschrift No. 1,109,953 shows an arrangement for measuring the quantity of incoming air by means of a temperature-dependent resistance. This resistance is heated and is placed in the air intake system of the internal combustion engine, so that its changes in resistance result from different amounts of cooling due to the air passing thereby. Since heat is transferred from the heating element to the temperature-dependent resistance with some delay, these arrangements can follow rapid changes in the quantity of air passing by the resistor only with considerable time delay. Thus a number of errors arise. Additionally, any variations in the heater output and variations in the temperature of the incoming air also result in additional errors so that the change in resistance does not actually constitute a sufficiently exact measure of the quantity of air taken in. However, it is important that an exact measure of air available for combustion be furnished, since improper ratios of fuel to air result in decreased efficiency and in the possibility of unburned fuel.

SUMMARY OF THE INVENTION

It is an object of the present invention to furnish an arrangement which yields a signal corresponding exactly to the quantity of air taken in. It is further desirable that such an arrangement operate with almost no time delay so that the exact quantity of fuel for clean combustion may be furnished.

It is a further object of the present invention to use the signal indicative of the measured air quantity to control the fuel injection.

In accordance with the present invention, temperature-dependent resistance means are positioned in the path of air intake. The temperature-dependent resistance means form part of a feedback circuit which furnishes a control current heating the resistance in such a way that the temperature of the temperature-dependent resistor is kept substantially constant. The control current heating the temperature-dependent resistance therefore constitutes a measure of the quantity of air taken in per unit time and this current, or a voltage proportional thereto, may be used to control the quantity of fuel injected. The temperature of the temperature-dependent resistor may therefore be considered as the reference value in the feedback circuit, while the current flowing therethrough is the output of the feedback circuit.

In a preferred embodiment of the present invention, the feedback circuit comprises a bridge circuit, one arm of which contains the temperature-dependent resistor. The bridge diagonal is connected to the input terminals of the amplifier which furnishes the regulating current. The output of the amplifier is connected in parallel with the two branches of the bridge circuit. The output of the amplifier thus serves to energize the bridge and further, the output voltage determines the amount of current flowing in the two branches, that is, it determines the control current flowing through the temperature-dependent resistor. This control current, or the output voltage of the amplifier which corresponds to this current, constitute a measure for the quantity of air taken in per unit time and can therefore be used for controlling the quantity of fuel to be injected. Since the temperature regulation in this arrangement is affected by changing the current in the resistance itself and since this current changes substantially instantaneously upon changes in the resistance value of the temperature-dependent resistor, thermal inertia effects are almost completely eliminated.

Suitable types of temperature-dependent resistance are either heated wired-type resistors or film-type resistors having a positive temperature coefficient. Negative temperature coefficient resistors can of course also be used if the amplifiers are suitably designed.

The control current, or the voltage corresponding thereto, can be used both for arrangements having continuous fuel injection, and for arrangements having intermittent fuel injection taking place synchronously with the timing of the engine. In arrangements wherein fuel is continuously injected, the control current or control voltage is used to control the amount of fuel injected per unit time and, more specifically, to control the fuel pressure at the injection valve or the cross-sectional area of the valve opening.

In arrangements wherein the fuel injection takes place synchronously with the operation of the cam shaft and wherein electromagnetic injection valves are used, the opening time of the injectors controls the total quantity of fuel injected, since the pressure remains constant. For this application, the control voltage (corresponding to the control current) is converted to an electrical signal (charge or voltage, or magnetic flux or current) which is stored in an electrical storage means and corresponds to the total quantity of air per stroke.

In a preferred embodiment of the present invention, conversion means are furnished which convert the control voltage to the above-mentioned electrical signal in a storage element. These conversion means comprise switch means operated in synchronism with the crank shaft of the engine and which connect the energy storage element with a charging source throughout a predetermined, preferably constant angle of rotation of the crank shaft.

This arrangement has the advantage that changes in the air flow do not change the temperature or the resistance of the temperature-dependent resistor to any substantial degree so that the resistance is always operated in a very limited region of its resistance-temperature characteristic. It has the further advantage that any sudden changes in air flow are available almost instantaneously in the form of changes in the control current flowing through the temperature-dependent resistance. Thus it is possible to regulate the fuel in correspondence to substantially instantaneous values of air intake.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
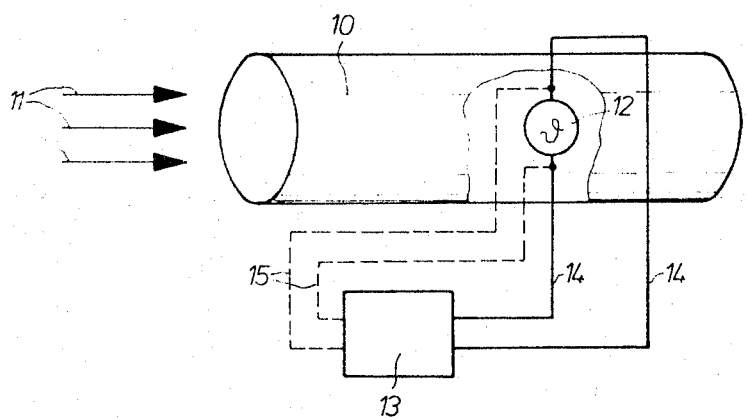
FIG. 1 shows an arrangement for measuring the the air intake quantity.

A preferred embodiment of the present invention will now be described with reference to the drawing.

In FIG. 1, intake means, namely an air intake pipe 10, are shown which represent the air intake pipe of an internal combustion engine in which air flows in the direction of arrows 11. A temperature-dependent resistance 12 is positioned in the path of this air. The temperature-dependent resistance 12 is interconnected with a closed loop control circuit, feedback circuit 13, in such a manner that the output current of circuit 13, as symbolized by line 14, flows therethrough, while resistance 12 is also connected to the input of feedback circuit 13, as symbolized by dashed lines 15. The resistance of temperature-dependent resistor 12 is kept at a value corresponding to a value somewhat exceeding the median air temperature, by means feedback circuit 13. Thus, if the flow rate of the intake air, that is the quantity of air taken in per unit time increases, the temperature-dependent resistance is cooled more rapidly. This cooling is indicated at the input of control circuit 13 via connection 15, so that the amplifier output at 14 is increased sufficiently so that the reference temperature value again exists at the temperature-dependent resistance 12. The output 14 of closed loop control circuit 13 always regulates the temperature of temperature-dependent resistance 12 in such a manner that it remains substantially constant independent of changes in the flow rate of the intake air. This output (14) thus constitutes a measure of the quantity of air taken in and is used to determine and control the quantity of fuel to be injected per unit time. The control circuits for controlling the fuel injection are not shown in FIG. 1, but will be shown below.

Figure 2:
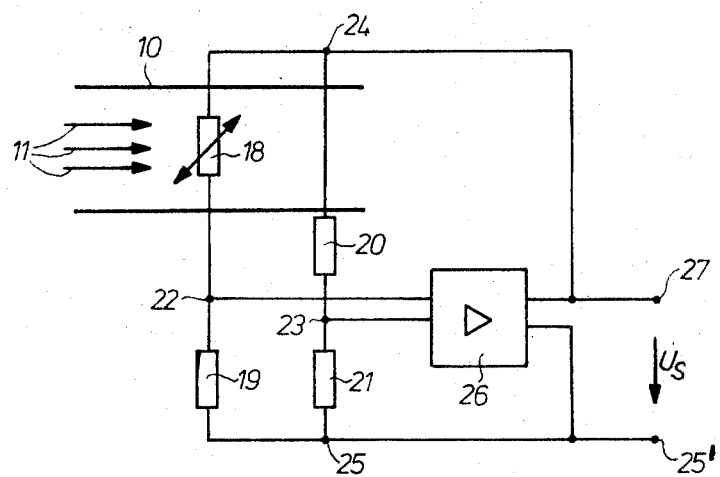
FIG. 2 shows a circuit arrangement used in the above measurement.

In the embodiment shown in FIG. 2, a temperature-dependent resistance 18 positioned within intake pipe 10 is in the path of air 11. The temperature-dependent resistance 18, together with a fixed resistance 19, constitute one branch of a bridge circuit, whose other branch has two fixed resistors 20 and 21. A terminal 22 is at the common point of resistors 18 and 19, while a terminal 23 is connected to the common point of resistors 20 and 21. The two bridge branches are connected in parallel from a point labeled 24 to a point labeled 25. The voltage existing between points 22 and 23 is connected to the input of an amplifier 26. The output terminals of amplifier 26 are connected to points 24 and 25 so that the output of the amplifier is in parallel with the two branches of the bridge and also serves to energize the bridge circuit. The output voltage of the amplifier is denoted by symbol $U_S$ herein and is available between terminals 27 (connected to terminal 24) and terminal 25' (connected to terminal 25). It is this voltage which controls the amount of fuel to be injected so that said amount of fuel corresponds to the quantity of air available for combustion. Temperature-dependent resistance 18 is heated by the current flowing therethrough until it attains a value at which the input voltage to amplifier 26 (the voltage across the diagonal of the bridge) either becomes zero or assumes a predetermined value. A corresponding control current then flows at the output of the amplifier into the bridge circuit. If the temperature of temperature-dependent resistance 18 changes because the flow rate of incoming air changes, then the input voltage to amplifier 26 changes, causing the output of the amplifier to change until the temperature of temperature-dependent resistance 18 reassumes its reference value. The output voltage of amplifier 26, herein referred to as the control voltage and denoted $U_S$, thus constitutes an air intake signal and represents a measure of the quantity of air taken in.

Figure 3:
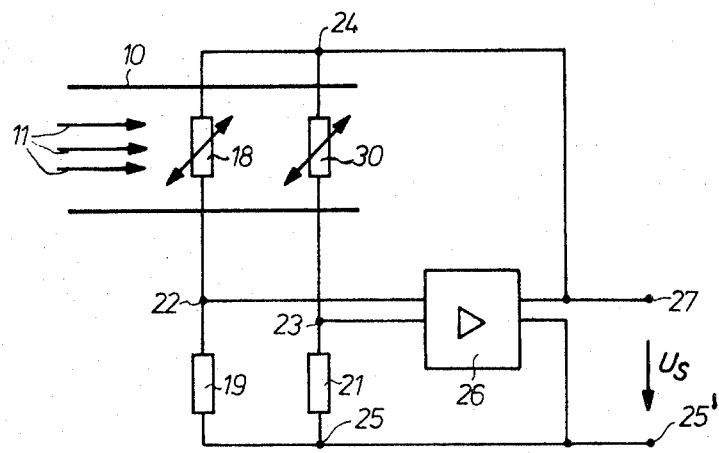
FIG. 3 and 4 show bridge measuring arrangements with means for compensating the temperature changes in the intake air.

FIG. 3 shows an arrangement similar to that of FIG. 2, except that fixed resistor 20 is replaced by a temperature varying resistor 30. The relative values of resistances 30 and 21 are chosen in such a manner that the power dissipated in temperature-resistance 30 by the branch current flowing therethrough, is sufficiently small that the temperature of this resistance does not vary to any appreciable extent with variations of voltage $U_S$. The temperature of this resistor thus corresponds with the temperature of the incoming air. In this fashion, the effect of air temperature on the control voltage is compensated for, causing voltage $U_S$ to be substantially independent of the temperature of intake air.

Figure 4:
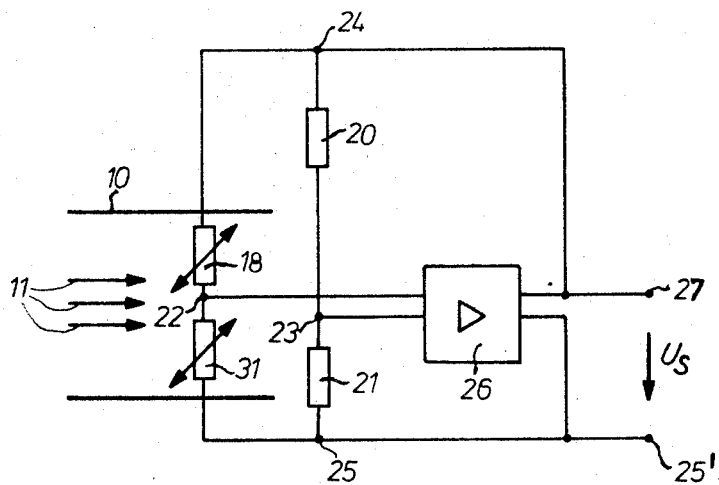

Compensation of air temperature can also be carried out as shown in FIG. 4. Here resistor 19 in FIG. 2 is replaced by a temperature varying resistance 31. Thus both temperature-dependent resistors (18 and 31) are in the same branch of the bridge and have the same current flowing therethrough. Resistor 31 must be sufficiently small that the power dissipated therein is very low, so that the temperature of this resistance does not change appreciably as a function of current flowing therethrough. Thus the resistance of resistor 31 has approximately the same temperature as the temperature of the air which is flowing by it.

Figure 5:
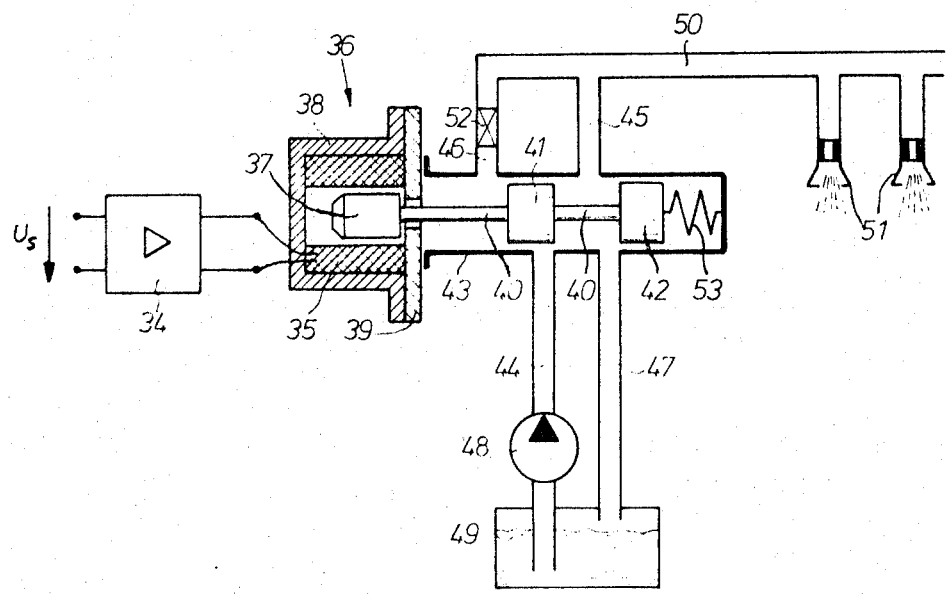
FIG. 5 shows an arrangement for controlling fuel injection in dependence on air intake in a continuous type injection system.

FIG. 5 shows an arrangement wherein the voltage $U_S$ is utilized to control the amount of fuel injected. In this embodiment, an internal combustion engine is shown wherein the fuel injection takes place continually. The control voltage $U_S$ is applied to the input of an amplifier 34. The output of amplifier 34 controls the winding 35 of a pressure regulator 36. Pressure regulator 36 operates in such a manner that the electrical input is converted to a pressure output which is proportional to the electrical input. Pressure regulator 36 has an armature 37 of soft magnetic material which is moved by the magnetic field generated by winding 35. Winding 35 is in a housing 38 which has a cover 39. Through cover 39, a slider 40 is connected with armature 37. Slider 40 has two regulating pistons 41 and 42 which move within a cylinder 43. Cylinder 43 has an intake opening 44, an outlet opening 45, a feedback opening 46 and a bypass opening 47. The input 44 is connected with a pump 48 which pumps the fuel from a fuel tank 49. Bypass 47 allows excess fuel to return to tank 49. A fuel line 50 connects outlet 45 with the injector valves 51. Further, line 50 is connected to the feedback opening 46 through a pressure regulating valve 52. Slider 40 and piston 42 work against the force exerted by a spring 53. The above-described arrangement operates as follows:

With the system as rest, no current flows through winding 35 and piston 41 covers inlet 44, so that no pressure from pump 48 can reach outlet 45 and thereby injector valves 51. As soon as a magnetic field is created within winding 35 through the control current furnished by amplifier 34, armature 37 moves towards the left, allowing piston 41 to free at least a part of inlet 44, while piston 42 covers opening 47 at least to some extent so that a pressure can build up in line 50. Slider 40 will continue to move until the sum of the forces acting thereon is equal to zero. This sum is formed through the addition of the magnetic force, the force of the spring, and the force exerted through the fuel fed back via opening 46. The pressure resulting in fuel line 50 thus corresponds exactly to the voltage $U_S$ at the input of amplifier 34. Thus in turn the amount of fuel injected corresponds to the voltage $U_S$ which in turn is a measured value indicative of the quantity of air taken in.

Figure 6:
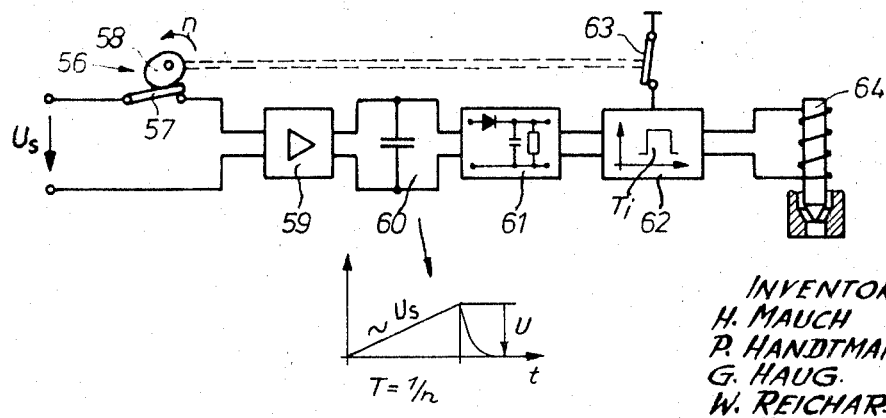
FIG. 6 and 7 show intermittently operating fuel injection systems controlled by the air intake signal measured in FIGS. 2 and 3.

FIG. 6 is a block diagram showing an arrangement wherein the voltage $U_S$, which is proportional to the quantity of fuel taken in per unit time, is utilized to control the open time of injectors which operate intermittently. Here the fuel pressure at the magnetic injectors is constant. Therefore the amount of fuel injected depends solely on how long the magnetic valves are open. In FIG. 6 the voltage $U_S$ is first transformed into a pulse sequence by means of a switch 56. The contact arm 57 of switch 56 is connected with an eccentric or cam 58 which is rotated at a speed synchronous with the rotational speed of the engine. The arm 57 is closed for each rotation of cam or eccentric 58 for the duration of a constant angle of rotation of the cam shaft, for example, for the duration of the intake stroke. The so-formed pulse sequence is applied to the input of an amplifier 59 at whose output is connected a capacitor 60. Amplifier 59 and capacitor 60 together constitute integrator means. The integrator means integrate the voltage $U_S$ for the duration of each pulse, so that the charge on the capacitor and thus the voltage across it, corresponds to the total amount of air taken in during the intake stroke. Switch 56 opens at the end of each pulse and capacitor 60 discharges so that the voltage at the condensor terminals at the beginning of the next pulse is again zero. The peak values of the integrator output voltage which corresponds to said voltage at the end of the pulse are retained by a peak responsive rectifier 61 and control a monostable multivibrator 62. The construction of such a responsive rectifier is well known and is indicated within block 61 in simplest terms only. Monostable multivibrator 62 is switched to its unstable state via a switch 63 which is operated in synchronism with the rotation of the engine cam shaft and is retained in its unstable state for a time period depending upon the output voltage of the peak responsive rectifier. This type of monostable multivibrator is known as a voltage controlled monostable multivibrator. The output of this multivibrator is connected to magnetic valve 64. This valve is sketched in simplified form in FIG. 6 and only the portions thereof which are required for the operation of the present invention are shown. In the example of FIG. 6, the integrator is represented by an amplifier whose output current charges a capacitor. Other embodiments of such circuits of course are possible. For example the integrating capacitor may be in the feedback circuit of an amplifier.

Figure 7:
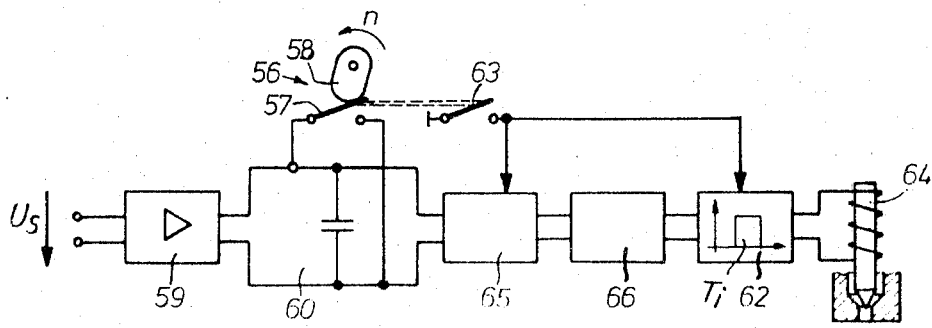

FIG. 7 shows another circuit for using voltage $U_S$ to generate the opening pulses for magnetic injectors in an intermittent type of injection arrangement. The voltage $U_S$ is again applied to an integrator, here comprising amplifier 59 and capacitor 60. In this embodiment, a switch 56 operating in synchronism with the rotation of the engine is connected in parallel with capacitor 60. The output voltage of the integrator corresponds to the integral of voltage $U_S$ over the time period wherein switch 56 is open. Each time switch 56 is closed, capacitor 60 discharges sufficiently rapidly so that the voltage is again zero at the start. The voltage across capacitor 60 is sampled just prior to closing of switch 56 by means of sampling means 65 and the so-sampled value is retained in a holding circuit 66 until the next value is obtained by sampling means 65. The output voltage of holding circuit 66 in turn controls the time interval wherein a monostable multivibrator 62 is in the unstable state. The monostable multivibrator 62 is changed to the unstable state by means of a switch 63 which is operated in synchronism with the rotation of the engine and also controls the operation of the sampling means 65.

The operation of the circuits shown in FIGS. 6 and 7 is the following:

The voltage $U_S$ is transformed into a pulse sequence by means of switch 56. The pulse width of these pulses decreases with increasing engine speed, while the amplitude of the pulses correspond to the instantaneous value of the voltage $U_S$. In the arrangement of FIG. 6, switch 56 is in the input circuit of the integrator, while in FIG. 7 the switch is in the output circuit. In both cases, the output of the integrator depends on both engine speed and on the value of $U_S$. The value of the integrator output at the end of each pulse controls the injection time, that is the time duration for which the injector injects fuel, and thereby the total quantity of fuel injected per operation cycle. In the arrangement of FIG. 6, the peak value at the output of the integrator is retained by peak responsive rectifier 61 and applied to monostable multivibrator 62. In the arrangement of FIG. 7, the output voltage of the integrator is sampled by sampling means 65 and the so-sampled value is retained in the hold circuit 66. The two circuits together perform the function of peak responsive rectifier 61 of FIG. 6. The output of the peak responsive rectifier 61 of FIG. 6 is herein referred to as the second signal and switches 56 together with integrator 59-60 and peak rectifier 61 together constitute conversion means. Similarly, in FIG. 7, the conversion means comprise integrator 59-60, sampling means 65 and hold circuit 66. Further, amplifier 59 is referred to as additional amplifier means. As mentioned above, the second signal, namely the output of peak rectifier 61 or hold circuit 66 in FIGS. 6 and 7 respectively, determines the time wherein the monostable multivibrator is in the unstable state, and therefore the time wherein injector 64 operates to inject fuel.

Figure 8:
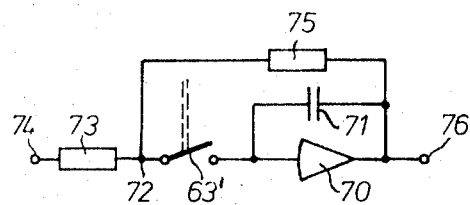
FIG. 8 shows one embodiment of the sampling arrangement used in FIG. 7.

FIG. 8 shows one embodiment of a possible combination of sampling means 64 and hold circuit 66. An operational amplifier 70 has a capacitor 71 in the feedback circuit. The terminal of capacitor 71 is connected to the input of amplifier 70 and is further connected to one contact of a switch 63' which is operated in synchronism with the rotation of the engine. The other contact of the switch is connected to a terminal 72. Between terminal 72 and the output of amplifier 70, is connected a resistance 75. Further connected to terminal 72 is a resistance 73 whose other terminal constitutes the input terminal of the arrangement and is labeled 74. When switch 63' is closed, the arrangement has the parallel combination of capacitor 71 and resistance 75 in the feedback circuit and operates as a first order delay means. As soon as switch 63' opens, the connection between the terminal of capacitor 71 and circuit point 72 is broken so that the output voltage at terminal 76 can no longer be changed, since capacitor 71 cannot discharge. Thus the sampling is effected by the closing of switch 63'. As long as switch 63' is closed, the voltage appearing at input terminal 74 creates a corresponding voltage at output terminal 76, the ratio between output and input being determined by the ratio of resistance 75 to 73. As soon as switch 63' is opened, the voltage at output terminal 76 remains the voltage which appeared at said terminal just prior to the opening of switch 63'.

Figure 9:
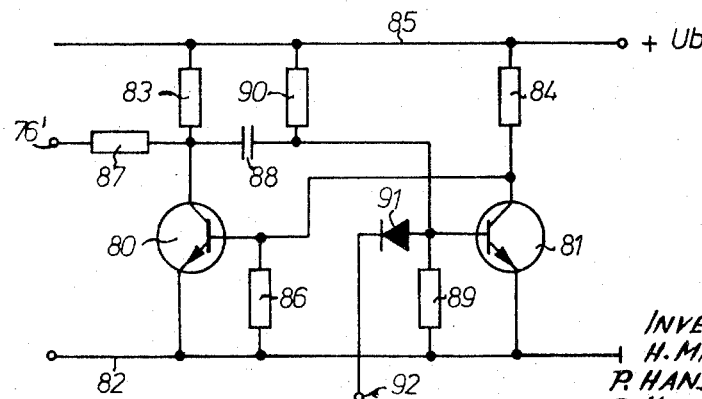
FIG. 9 shows a regulating means for regulating the fuel injection time in accordance with FIGS. 6 or 7.

FIG. 9 shows one embodiment of a voltage controlled monostable multivibrator as might be used in the circuits of FIGS. 6 or 7. The multivibrator comprises a transistor 80 and a transistor 81. The emitters of both transistors are connected to ground line 82, while the collector of transistor 80 is connected to the positive supply line 85 via a resistance 83, and the collector of transistor 81 is connected to said positive supply line 85 via a resistance 84. The base of transistor 80 is connected to ground via a resistance 86, and is further directly connected to the collector of transistor 81. The collector of transistor 80 is connected via a resistance 87 with a terminal 76'. Terminal 76' is connected with output terminal 76 of the scanning arrangement shown in FIG. 8. The collector of transistor 80 is further connected to capacitor 88 whose other terminal is connected to the base of transistor 81. The base of transistor 81 is connected to ground via a resistance 89 and is connected to line 85 via a resistance 90. Further, the base of transistor 81 is connected via a diode 91 to a terminal 92 at which negative control pulses are supplied to the multivibrator via switch 63 (see FIG. 7).

The above-described arrangement operates as follows:

Under quiescent conditions, transistor 81 is conductive because of the positive voltage appearing at its base due to the voltage divider comprising resistors 89 amd 90. Transistor 80 is blocked. The potential at the collector of transistor 81 is approximately ground potential, which causes the base of transistor 80 to be substantially at ground potential, causing transistor 80 to block. Capacitor 88 charges to a potential which corresponds to the potential existing at its terminals. The potential at the first capacitor terminal is the same as the potential at the collector of transistor 80, while the potential at the second capacitor terminal is the same as the potential at the base of transistor 81. Since transistor 80 is blocked, the voltage at its collector is determined by the addition of voltages appearing across resistors 83 and 87. The voltage at the base of transistor 81 is a small positive voltage which just suffices to keep the transistor in a conductive state. As mentioned previously, capacitor 88 charges to the voltage existing between the collector of transistor 80 and base of transistor 81. If now a negative pulse is applied to base of transistor 81, this transistor blocks. This causes an increase in voltage at its collector anc causes transistor 80 to become conductive. This switching process is aided by the feedback coupling so that transistor 81 remains blocked and transistor 80 becomes more conductive. Since the energy of a capacitor cannot change instantaneously, the voltage at the base of transistor 81, when transistor 80 becomes conductive, changes to a value which is below the previous base potential by an amount equal to the voltage across the capacitor under quiescent conditions. Transistor 81 can only become conductive again when its base is slightly positive relative to its emitter, that is when capacitor 88 has discharged. The time required for the discharge of capacitor 88 depends upon the height of the voltage to which it is charged during quiescent conditions. However, the voltage to which it is charged in turn depends upon the voltage applied at terminal 76'. Thus the time wherein the multivibrator is in the unstable state, that is the time labeled $T_i$ in FIG. 7 depends upon the voltage to which capacitor is charged, that is the voltage existing at terminal 76'.

While the invention has been illustrated and described as embodied in a control circuit using a bridge arrangement, it is not intended to be limited to the details shown, since various modifications, structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended;

1. In an internal combustion engine, an arrangement for measuring the flow rate of the intake air and furnishing an air intake signal in correspondence thereto, comprising, in combination, bridge circuit means having at least one temperature dependent resistor, said temperature dependent resistor having resistance varying as a function of temperature and therefore as a function of current flowing therethrough, positioned in the path of said air, whereby changes in said rate of flow change the cooling effect of said air thereby changing said resistance, said bridge circuit means having input terminals connected to said temperature dependent resistor for receiving a control current, changes in said control current changing said resistance, said bridge circuit means further having output terminals for furnishing an output voltage varying as a function of said resistance of said temperature dependent resistor; and amplifier means having an input connected to said output terminals and an output connected to said input terminals, for furnishing a control current varyin dependence on said output voltage in such a manner that said resistance of said temperature dependent resistor remains substantially constant independent of said flow of air, whereby said control current constitutes a measure of said air flow, thereby constituting said air intake signal.

2. An arrangement as set forth in claim 1, further comprising means furnishing a control voltage corresponding to said control current, said control voltage constituting said air intake signal.

3. An arrangement as set forth in claim 2, wherein said internal combustion engine further comprises fuel injection means, and regulator means connected to said fuel injection means and said closed loop control circuit means for controlling the quantity of injected fuel as a function of said air intake signal.

4. An arrangement as set forth in claim 2, wherein said fuel injection means comprise injection valve means; wherein the quantity of fuel injected varies as a function of fuel pressure at said injection valve means; and wherein said regulator means comprise means controlling said pressure in dependence on said air intake signal.

5. An arrangement as set forth in claim 2, wherein said fuel injection means comprise injection valve means; wherein the quantity of fuel injected varies in dependence upon the valve opening of said injection valve means; and wherein said regulator means comprise means controlling said valve opening in dependence upon said air intake signal.

6. An arrangement as set forth in claim 2, wherein said internal combustion engine operates with at least one intake phase per operating cycle; wherein said internal combustion engine further comprises a rotating shaft; wherein said injection means comprise timed injection means injecting fuel for a determined injection time per cycle, said timed injection means operating in synchronism with said rotating cam shaft; and wherein said regulator means comprise means varying said injection time as a function of said air intake signal.

7. An arrangement as set forth in claim 6, further comprising conversion means converting said air intake signal to a second signal corresponding to the total quantity of air intake per engine stroke.

8. An arrangement as set forth in claim 7, wherein said conversion means comprise signal storage means; and switch means operated synchronously with said cam shaft for connecting said signal storage means to said output of said amplifier means when closed, thereby furnishing a sequence of pulses to said signal storage means.

9. An arrangement as set forth in claim 8, wherein said switch means are closed for a predetermined constant angle of rotation of said cam shaft.

10. An arrangement as set forth in claim 9, further comprising integrator means connected between said switch means and said signal storage means for furnishing an integrator output signal corresponding to the amplitude of said pulses multiplied by the time duration of said pulses; and wherein said signal storage means store the value of said integrator output signal at the end of each of said pulses in said sequence of pulses.

11. An arrangement as set forth in claim 10, wherein said signal storage means comprise peak-responsive rectifier means.

12. An arrangement as set forth in claim 6, wherein said regulator means comprise voltage-controlled monostable multivibrator means.

13. An arrangement as set forth in claim 6, wherein said conversion means comprise integrator means integrating said air intake signal and furnishing an integrated air intake signal; sampling means connected to the output of said integrator means for sampling said integrated air intake signal at a predetermined time in the operating cycle of said engine; and hold circuit means connected to the output of said sampling means for maintaining said so-sampled integrated intake signal between successive sampling times; and wherein said regulator means comprise voltage-controlled monostable multivibrator means connected to the output of said hold circuit means, and means switching said monostable multivibrator means into the unstable state in synchronism with the operation of said sampling means.

14. An arrangement as set forth in claim 13, wherein said integrator means comprise additional amplifier means having an output and integrator capacitor means connected to said output of said additional amplifier means.

15. An arrangement as set forth in claim 14, further comprising integrator shunting means operated in synchronism with said sampling means for shunting said integrator capacitor following each operation of said sampling means.

* * * * *